United States Patent
Lee et al.

(10) Patent No.: US 11,685,795 B2
(45) Date of Patent: Jun. 27, 2023

(54) METHOD OF PRODUCING ETHYLENE-CARBOXYLIC ACID COMPOLYMER

(71) Applicants: SK Innovation Co., Ltd., Seoul (KR); SK Geo Centric Co., Ltd., Seoul (KR)

(72) Inventors: Ho Seong Lee, Daejeon (KR); Sun Joo Kim, Daejeon (KR); Jae Hyun Park, Daejeon (KR); Min Gu Kim, Daejeon (KR); Jang Hoon Ock, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 169 days.

(21) Appl. No.: 17/179,938

(22) Filed: Feb. 19, 2021

(65) Prior Publication Data
US 2021/0261695 A1 Aug. 26, 2021

(30) Foreign Application Priority Data
Feb. 20, 2020 (KR) .................. 10-2020-0020783

(51) Int. Cl.
C08F 2/01 (2006.01)
C08F 2/14 (2006.01)
C08F 210/02 (2006.01)

(52) U.S. Cl.
CPC . *C08F 2/01* (2013.01); *C08F 2/14* (2013.01)

(58) Field of Classification Search
None
See application file for complete search history.

(56) References Cited

U.S. PATENT DOCUMENTS

| | | | |
|---|---|---|---|
| 4,721,761 A * | 1/1988 | Omae | C08F 210/00 526/329 |
| 9,371,406 B2 | 6/2016 | Cornelissen | |
| 9,416,209 B2 | 8/2016 | Berbee et al. | |
| 9,920,142 B2 | 3/2018 | Kitade et al. | |
| 10,144,898 B2 | 12/2018 | Gutermuth et al. | |
| 10,155,705 B2 | 12/2018 | Masere et al. | |

FOREIGN PATENT DOCUMENTS

| | | |
|---|---|---|
| EP | 2897988 B1 | 12/2017 |
| JP | S5855964 B2 | 12/1983 |
| KR | 1020150099761 A | 9/2015 |
| WO | 2016077512 A2 | 5/2016 |
| WO | 2016172076 A1 | 10/2016 |

* cited by examiner

*Primary Examiner* — Fred M Teskin
(74) *Attorney, Agent, or Firm* — The Webb Law Firm

(57) ABSTRACT

In a method of producing an ethylene-carboxylic acid copolymer, a monomer solution containing a carboxylic acid monomer is supplied from a discharging unit. The carboxylic acid monomer is copolymerized with an ethylene-based monomer. A coefficient of friction between the discharging unit and the monomer solution is maintained as 0.3 or less.

13 Claims, 8 Drawing Sheets

METHOD OF PRODUCING ETHYLENE-CARBOXYLIC ACID COMPOLYMER

CROSS-REFERENCE TO RELATED APPLICATION

This application claims priority to Korean Patent Application No. 10-2020-0020783 filed Feb. 20, 2020, the disclosure of which is hereby incorporated by reference in its entirety.

BACKGROUND OF THE INVENTION

1. Field of the Invention

The present invention relates to a method of producing an ethylene-carboxylic acid copolymer. More particularly, the present invention relates to a method of producing an ethylene-carboxylic acid copolymer including pumping of a carboxylic acid monomer.

2. Description of the Related Art

For example, an ethylene-carboxylic acid copolymer such as an ethylene-acrylic acid copolymer is used for various products such as a sealing material, an adhesive, a packing material, an optical film, etc.

The ethylene-carboxylic acid copolymer may be prepared by polymerizing ethylene and a carboxylic acid-based compound (e.g., acrylic acid, methacrylic acid, etc.) as a comonomer through a continuous reactor.

The carboxylic acid-based compounds have higher self-reactivity than that of ethylene, and thus may be self-polymerized when exposed to a high temperature while being supplied through a flow path, a pump, a compressor, or the like. In this case, equipment failures such as clogging or blocking of the above-described equipment such as the pump, the compressor and the flow path may be caused to result in a degradation of a production yield of the copolymer, and a uniform process repetition may not be easily performed.

Accordingly, a method of using an additive for inhibiting the self-polymerization in addition to monomers for copolymerization is being researched. However, environmental pollution issues may be caused by the additive, and a copolymer yield may also be affected by the additive. Thus, suppression of the self-polymerization suppression is also required from an aspect of a construction of polymerization equipment.

For example, International Patent Application Publication No. WO2016/172076 discloses a use of a polymerization inhibitor for preventing a fouling of a polymerization reaction, but does not disclose a design for preventing the self-polymerization in equipment and process units as described above.

SUMMARY OF THE INVENTION

According to an aspect of the present invention, there is provided a method of producing an ethylene-carboxylic acid copolymer having improved process reliability and polymerization efficiency.

In a method of producing an ethylene-carboxylic acid copolymer, a monomer solution containing a carboxylic acid monomer is supplied from a discharging unit. The carboxylic acid monomer is copolymerized with an ethylene-based monomer. A coefficient of friction between the discharging unit and the monomer solution is maintained as 0.3 or less.

In some embodiments, the coefficient of friction between the discharging unit and the monomer solution may be maintained as 0.1 or less.

In some embodiments, the discharging unit may include a piston and a packing unit surrounding the piston.

In some embodiments, the coefficient of friction between a surface of the piston and the monomer solution, and the coefficient of friction between the packing unit and the monomer solution may be all maintained as 0.3 or less.

In some embodiments, the piston and the packing unit may each have a surface roughness (Ra) of less than 75 nm.

In some embodiments, the piston and the packing unit may each have a surface roughness (Ra) of 2 nm or less.

In some embodiments, a temperature in the discharging unit may be 85° C. or less.

In some embodiments, a temperature in the discharging unit may be from 20° C. to 60° C.

In some embodiments, a lubricating composition may be further supplied into the discharging unit.

In some embodiments, an amount of a dissolved oxygen in the lubricating composition is 10 ppm or less.

In some embodiments, the lubricating composition may include a base oil and a phenothiazine-based polymerization inhibitor, and an amount of the polymerization inhibitor in the lubricating composition may be from 0.1 ppm to 10 ppm.

In some embodiments, the ethylene-based monomer may be injected after the monomer solution is supplied from the discharging unit in the copolymerizing the carboxylic acid monomer with the ethylene-based monomer.

In some embodiments, the monomer solution may further include the ethylene-based monomer. The monomer solution containing the carboxylic acid monomer and the ethylene-based monomer may be injected into a reactor from the discharging unit in the copolymerizing the carboxylic acid monomer with the ethylene-based monomer.

According to embodiments of the present invention, generation of a self-polymer such as polyacrylic acid (PAA) may be suppressed by adjusting a friction coefficient of a discharging unit in contact with a carboxylic acid monomer. Accordingly, a desired copolymer yield may be achieved while suppressing a clogging of a polymerization equipment.

In some embodiments, a friction coefficient at which a self-polymerization does not occur may be stably maintained by adjusting a surface roughness of the discharging unit and temperature/pressure at an inside of the discharging unit.

DESCRIPTION OF THE INVENTION

According to exemplary embodiments of the present invention, there is provided a method of producing an ethylene-carboxylic acid copolymer including a pumping of a carboxylic acid monomer through a discharging unit to prevent a self-polymerization of the carboxylic acid monomer.

Hereinafter, the present invention will be described in detail with reference to the accompanying experimental examples and drawings. However, those skilled in the art will appreciate that such embodiments described with reference to the accompanying drawings are provided to further understand the spirit of the present invention and do not limit subject matters to be protected as disclosed in the detailed description and appended claims.

Figure 1A:
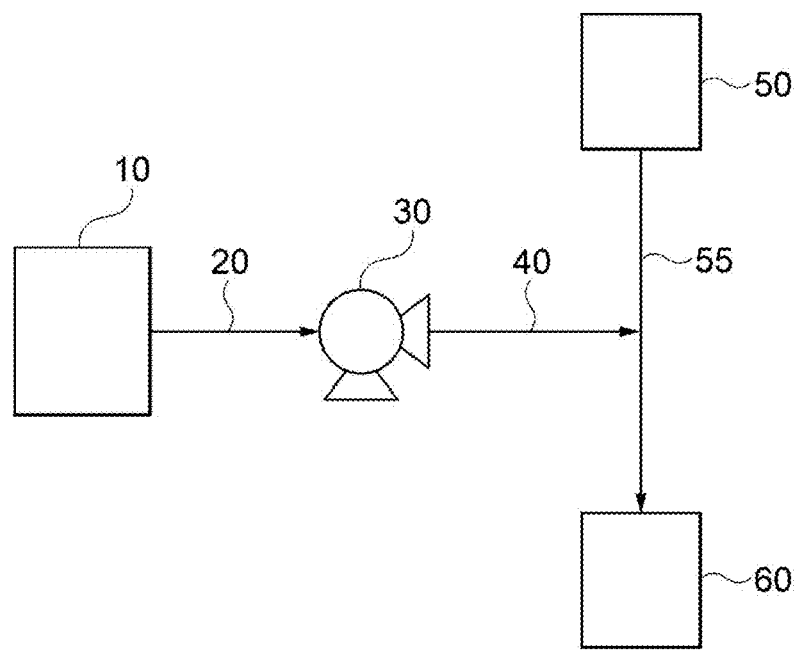
FIGS. 1A and 1B are flow diagram illustrating a method of producing a copolymer in accordance with exemplary embodiments.
Figure 1B:
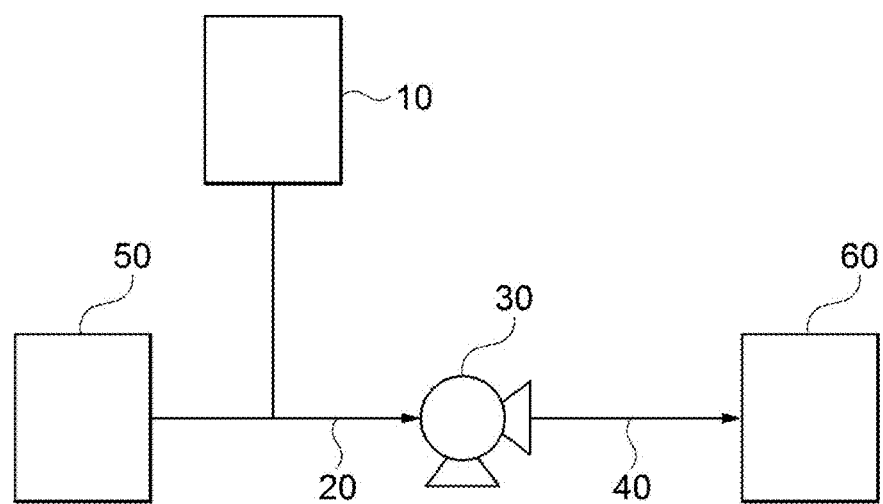
Figure 2:
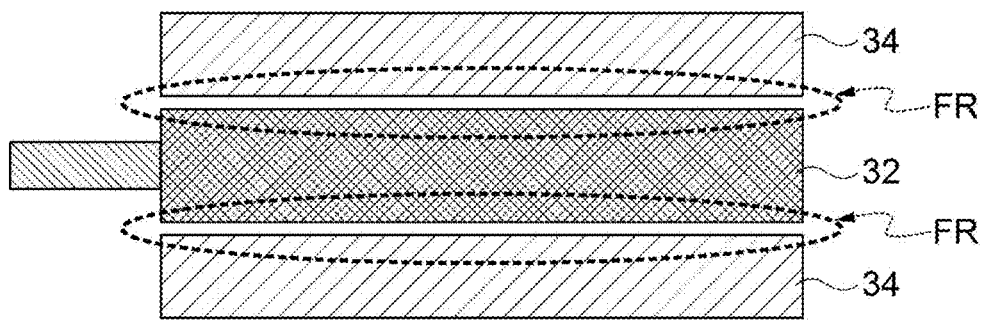
FIG. 2 is a schematic cross-sectional view illustrating a discharging unit in accordance with exemplary embodiments.

FIGS. 1A and 1B are flow diagram illustrating a method of producing a copolymer in accordance with exemplary embodiments. FIG. 2 is a schematic cross-sectional view illustrating a discharging unit in accordance with exemplary embodiments.

Referring to FIG. 1A, a first monomer solution including a carboxylic acid-based monomer may be supplied from a first monomer supply unit 10.

The carboxylic acid-based monomer may include an unsaturated carboxylic acid capable of inducing a chain polymerization reaction. In exemplary embodiments, (meth)acrylic acid or an ester thereof (e.g., (meth)acrylate) may be used as the carboxylic acid-based monomer. In the present application, the term "(meth)acrylic acid" is used to include both methacrylic acid and acrylic acid.

For example, a first monomer solution including a carboxylic acid-based monomer may be transferred to a discharging unit 30 from the first monomer supply unit 10 such as a storage tank through a first flow path 20.

For example, one or more additive such as a reaction inhibitor and an anti-oxidant may be included in the first monomer solution.

The first monomer solution may be delivered to the discharging unit 30 and may be discharged through a discharge flow path 40 for a copolymerization with, e.g., an ethylene-based polymerizable monomer.

The discharging unit 30 may include, e.g., a discharging device such as a pump, a compressor, etc.

Referring to FIG. 2, the discharging unit 30 may include a piston 32 and a packing unit 34. The carboxylic acid-based monomer supplied through the first flow path 20 may be pumped or ejected by a reciprocating motion of the piston 32 in the packing unit 34. The packing unit 34 may be, e.g., a sealing member such as a bushing or a cylinder.

For example, the first monomer solution may be ejected through a relative reciprocating motion and/or rotational motion of the piston 32 and the packing unit 34.

As illustrated FIG. 2, a friction between the piston 32 and the packing unit 34 may be repeatedly generated in a gap between the piston 32 and the packing unit 34 to create a friction generating region FR. A local temperature increase may be caused by a frictional heat in the friction generating region FR. Accordingly, when a temperature exceeds a self-polymerization temperature of the carboxylic acid-based monomer or an activation energy required for the self-polymerization is satisfied by a friction energy, a self-polymer such as polyacrylic acid (PAA) may be generated.

In this case, a clogging of the gap may be caused and an exchange period or a cleaning period of the discharging unit 30 may be shortened. Accordingly, a process efficiency and a desired yield of the copolymer may be deteriorated.

In exemplary embodiments, a coefficient of friction (CoF) between the first monomer solution and the discharging unit 30 may be adjusted to be 0.3 or less. For example, both the coefficient of friction between the first monomer solution and the piston 32 and the coefficient of friction between the first monomer solution and the packing unit 34 may be adjusted to be 0.3 or less.

Thus, the self-polymerization occurring in the friction generating region FR may be substantially suppressed. Preferably, the coefficient of friction (CoF) between the first monomer solution and the discharging unit 30 may be adjusted to be 0.1 or less.

The coefficient of friction between the first monomer solution and the discharging unit 30 may be controlled by a contact pressure in the discharging unit 30, a pumping temperature, a rotational speed or a translational speed of the piston 34 in the packing unit 34, a surface roughness of the piston 32 and/or the packing unit 34, etc.

In some embodiments, a surface roughness (Ra) of a contact surface with the first monomer solution of the discharging unit 30 may be less than 75 nm. Preferably, the surface roughness of the contact surface with the first monomer solution of the discharging unit 30 may be 2 nm or less. In this case, an increase of a frictional force may be suppressed even under harsh discharging conditions to substantially prevent a self-polymer formation.

In some embodiments, a temperature (e.g., a pumping temperature) in the discharging unit 30 may be 85° C. or less. Within the temperature range, a possibility of the self-polymerization of the carboxylic acid monomer may be substantially reduced.

Preferably, the temperature in the discharging unit 30 may be from 20° C. to 60° C. Within the above range, the coefficient of friction in the discharging unit 30 may be constantly maintained without fluctuation or disturbance, so that a stable discharge process may be continuously maintained.

In some embodiments, a contact pressure between the piston 32 and the packing unit 34 in the discharging unit 30 may be about 5,400 bar or more. Within the above range, the coefficient of friction in the discharging unit 30 may be easily maintained as 0.3 or less. In a preferable embodiment, the contact pressure between the piston 32 and the packing unit 34 may be about 8,100 bar or more.

In some embodiments, a lubricating composition may be supplied into the discharging unit 30 together with the first monomer solution. The lubricating composition may include a mineral oil, and may further include a self-polymerization inhibitor such as a phenothiazine-based compound.

The phenothiazine-based compound may cause environmental pollution issues. Thus, when included in the lubricating composition, the phenothiazine-based compound may be included in a range of 20 ppm or less, preferably from 0.1 ppm to 10 ppm.

Even when a phenothiazine-based compound is included in a small amount or is not included, the generation of the self-polymer (e.g., PAA) may be sufficiently suppressed by adjusting the coefficient of friction in the discharging unit 30 as described above.

In an embodiment, dissolved oxygen in the lubricating composition may be adjusted to be 10 ppm or less. Within the above range, for example, an acceleration of a radical self-polymerization by a reactive oxygen species contained in the lubricating composition may be prevented.

A second monomer solution stored in a second monomer supply unit 50 may be transferred through a second flow path 55 to contact the carboxylic acid-based monomer supplied through the discharge flow path 40, and may be copolymerized in a reactor 60. In exemplary embodiments, the second monomer solution may include an ethylene-based polymerizable monomer.

If ethylene is used as the second monomer, copolymerization of the carboxylic acid-based monomer and ethylene may be performed in the reactor 60 to prepare an ethylene-carboxylic acid copolymer (e.g., an EAA copolymer).

In some embodiments, a polymerization initiator may be introduced together into the reactor 60 through the second flow path 55 or through another flow path. In this case, the polymerization initiator may prevent the self-polymerization of the carboxylic acid-based monomer from being accelerated in advance.

For example, the polymerization initiator widely known in the field of a polymerization may be used. For example, a peroxide-based or peroxy-based compound, an azobis-based compound or the like may be used as the polymerization initiator.

In some embodiments, a chain transfer agent may be introduced during the polymerization process through, e.g., the second flow path 55. A molecular weight and a molecular weight distribution of a polymer product may be easily controlled within a desired range by the chain transfer agent.

The chain transfer agent may include, e.g., a non-polar organic compound such as isobutane and propene, or a polar organic compound such as methyl ethyl ketone, isopropylaldehyde and vinyl acetate. A temperature in the reactor 60 may be higher than a temperature in the discharging unit 30. For example, the temperature in the reactor 60 may be from about 150° C. to about 270° C.

In some embodiments, a pressure in the reactor 60 may range from 1,100 bar to 2,500 bar, preferably from 1,300 bar to 2,300 bar. In an embodiment, a pumping pressure in the discharging unit 30 may be greater than a copolymerization pressure in the reactor 60. For example, the pumping pressure in the discharging unit 30 may be in a range from 1,500 bar to 3,000 bar.

Referring to FIG. 1B, a monomer solution may be supplied from each of the first monomer supply unit 10 and the second monomer supply unit 50 to be mixed with each other. Accordingly, a mixed monomer solution including the carboxylic acid-based monomer and the ethylene-based monomer may be supplied to the discharging unit 30 through the first flow path 20.

The mixed monomer solution may be pumped from the discharging unit 30 and supplied to the reactor 60 through the discharge flow path 40. For example, the polymerization initiator injected into the reactor 60 may react with the mixed monomer solution to obtain an ethylene-carboxylic acid copolymer.

As illustrated in FIG. 1B, when the mixed monomer solution is supplied into the discharging unit 30, for example, an EAA copolymer may be produced in advance to cause the clogging of the discharging unit 30. Even in this case, the friction coefficient between the discharging unit 30 and the mixed monomer solution may be adjusted as described above so that a fouling by the EAA copolymer and a decrease in process efficiency may be reduced or prevented.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

Experimental Example 1

A monomer solution was prepared by mixing 20 wt % of acrylic acid (AA) (99% purity, manufactured by Sigma-Aldrich) in base oil (HYPERCOMP-1000, manufactured by SK Innovation). The prepared monomer solution was subjected to a frictional force measurement equipment (MTM (Mini-Traction Machine) 2) to measure a coefficient of friction while rotating a disk and a ball therein, and to detect a generation of a self-polymer.

Figure 3:
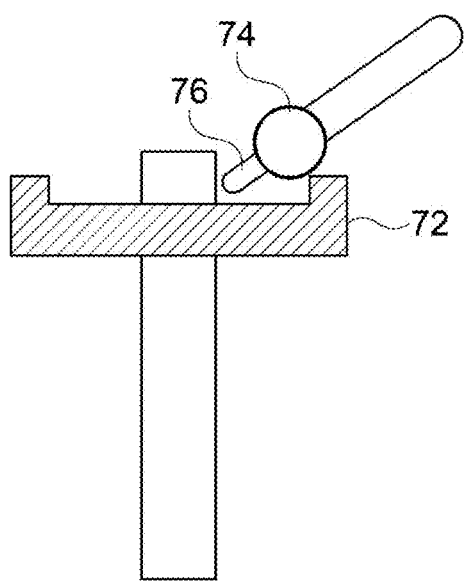
FIG. 3 is a schematic view illustrating a disk and a ball in a measuring device of a friction coefficient.
Figure 4:
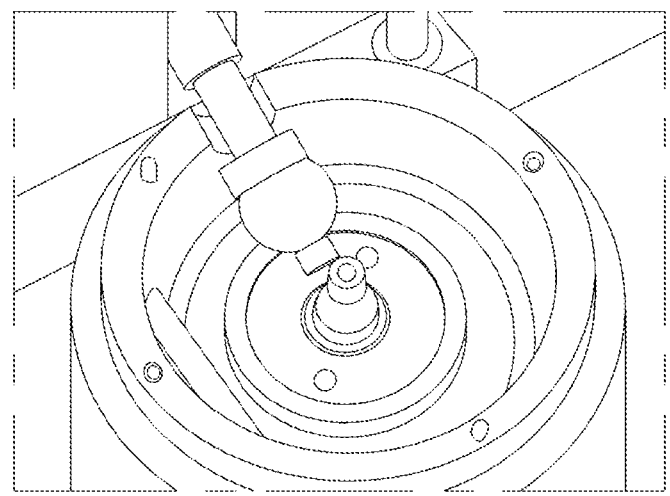
FIG. 4 is an image showing a disk and a ball in a measuring device of a friction coefficient.

FIG. 3 is a schematic view illustrating a disk and a ball in a measuring device of a friction coefficient. FIG. 4 is an image showing a disk and a ball in a measuring device of a friction coefficient.

Referring to FIGS. 3 and 4, after supplying the monomer solution into a disk 72 through an injection hole 76 coupled with a ball 74 at an initial temperature of 55° C., the disk 72 and the ball 74 were in contact with the monomer solution while rotating the disk 72 and the ball 74 together.

The coefficient of friction (CoF) was measured while varying a load and a slide roll ratio (SRR) between the disk 72 and the ball 74. Further, it was observed whether the self-polymer was generated or not.

The load between the disk 72 and the ball 74 may substantially correspond to a contact pressure between the piston 32 and the packing unit 34 in the discharging unit 30. A load of 37N corresponds to a contact pressure of 1 GPa (about 10,000 bar). For example, a load of 20N corresponds to about 5,400 bar.

Specifically, as the SRR increases, probability of friction may increase. When the SRR is 0%, the ball 74 and the disk 72 may rotate in the same direction and at the same speed. When the SRR is 100%, for example, only the ball 74 may rotate while the disk 72 is stopped. When the SRR is 200%, the ball 74 and the disk 72 may rotate in opposite directions and at the same speed.

Further, the experiment was repeated using two disks each having a surface roughness of 2 nm (hereinafter, referred to as a polished disk) and a 75 nm disk (hereinafter, referred to as a rough disk). When rotating the ball 74 and/or the disk 72, the rotation speed was adjusted to 250 mm/s.

Figure 5:
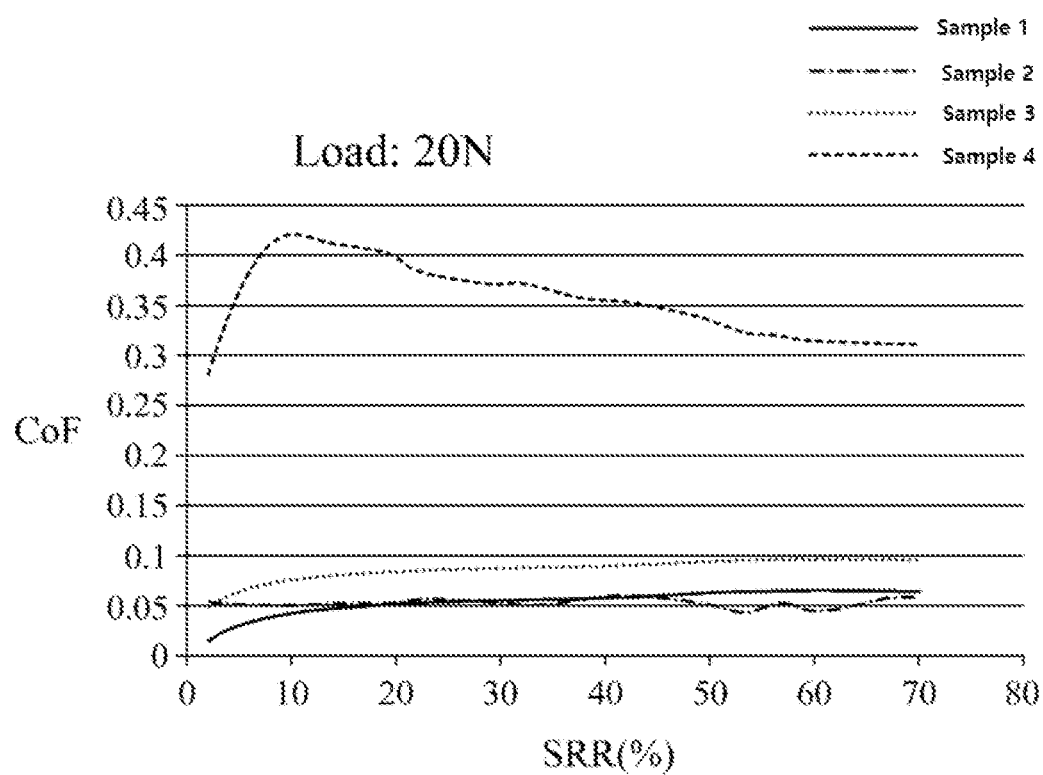
FIGS. 5 to 7 are graphs showing a change of friction coefficient according to Experimental Example 1.
Figure 6:
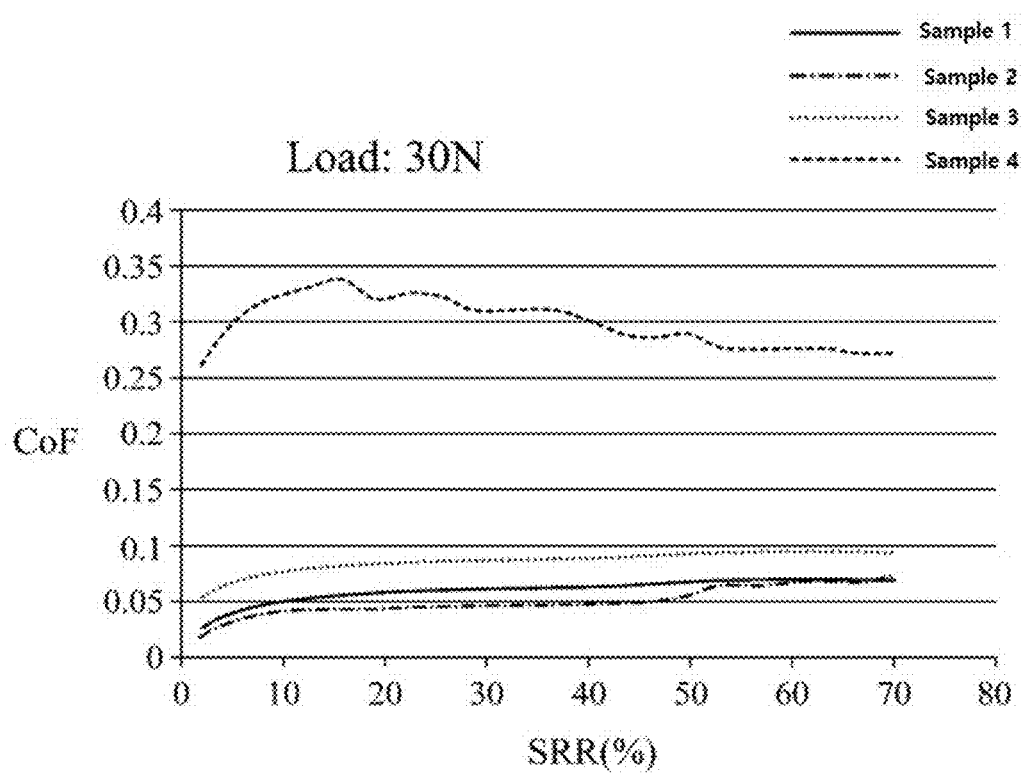
Figure 7:
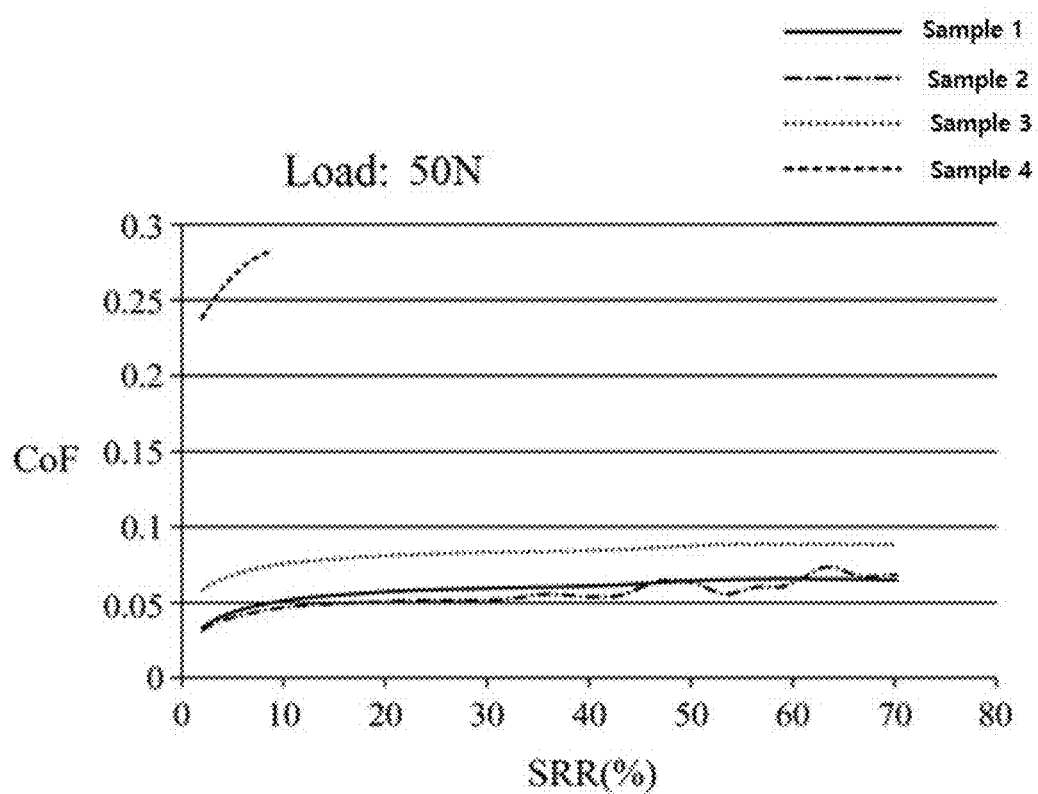

FIGS. 5 to 7 are graphs showing a change of friction coefficient according to Experimental Example 1.

Specifically, in FIGS. 5 to 7, Sample 1 was an example using the base oil (excluding AA) and the polished disk, Sample 2 was an example using the monomer solution and the polished disk, Sample 3 was an example using the base oil and the rough disk, and Sample 4 was an example using the monomer solution and the rough disk.

In the samples of Experimental Example 1, precipitation of a PAA self-polymer was commonly observed at a bottom of the disk 72 as the coefficient of friction exceeded 0.3.

Referring to FIG. 5, when compared with Sample 3 containing only the base oil in the rough disk, the coefficient of friction in Sample 4 including AA increased sharply and exceeded 0.3 in a substantially entire SRR range. In the case of Samples 1 and 2 using the polished disk, the coefficient of friction less than 0.1 at which the self-polymerization did not occur was stably maintained.

Referring to FIG. 6, as the pumping load increased to 30N, an increasing rate of in the coefficient of friction in Sample 4 was suppressed. Referring to FIG. 7, when the pumping load increased to 50N and the SRR was 10%, the friction coefficient was suppressed to less than 0.3.

Experimental Example 2

CL1000 lube oil (manufactured by Sonneborn) was used as a lubricant, and the rough disk, the base oil, the AA monomer and the monomer solution the same as those in Experimental Example 1 were used. While changing a temperature and a load, an increase of the coefficient of friction according to the SRR was observed.

Figure 8:
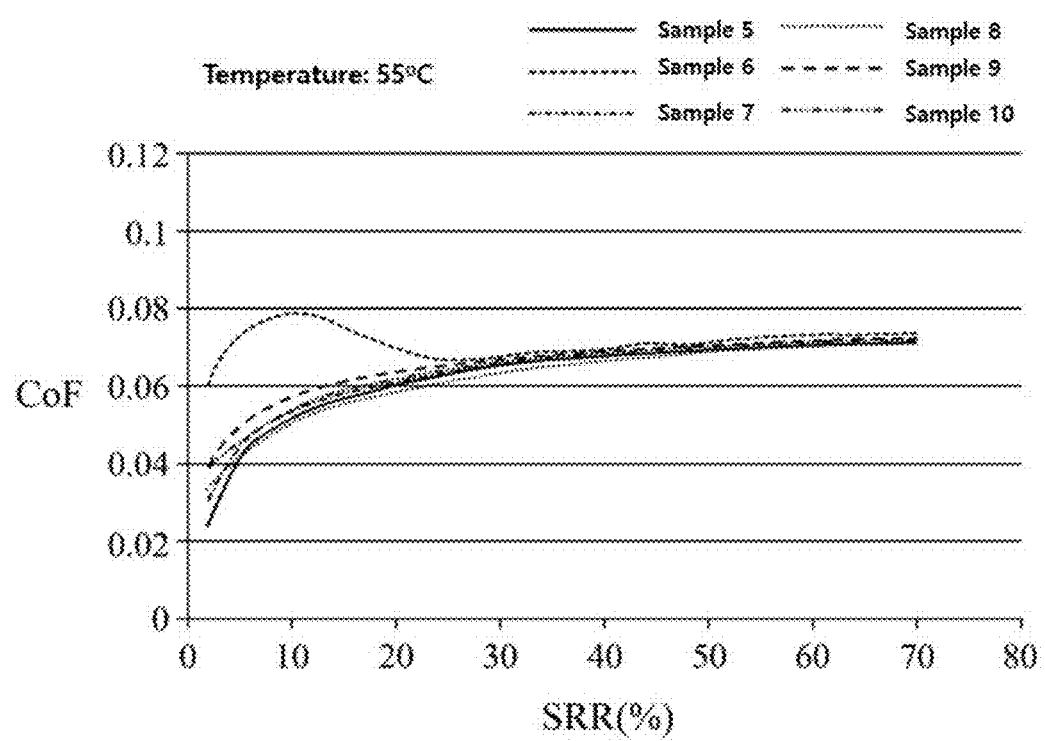
FIGS. 8 to 10 are graphs showing a change of friction coefficient according to Experimental Example 2.
Figure 9:
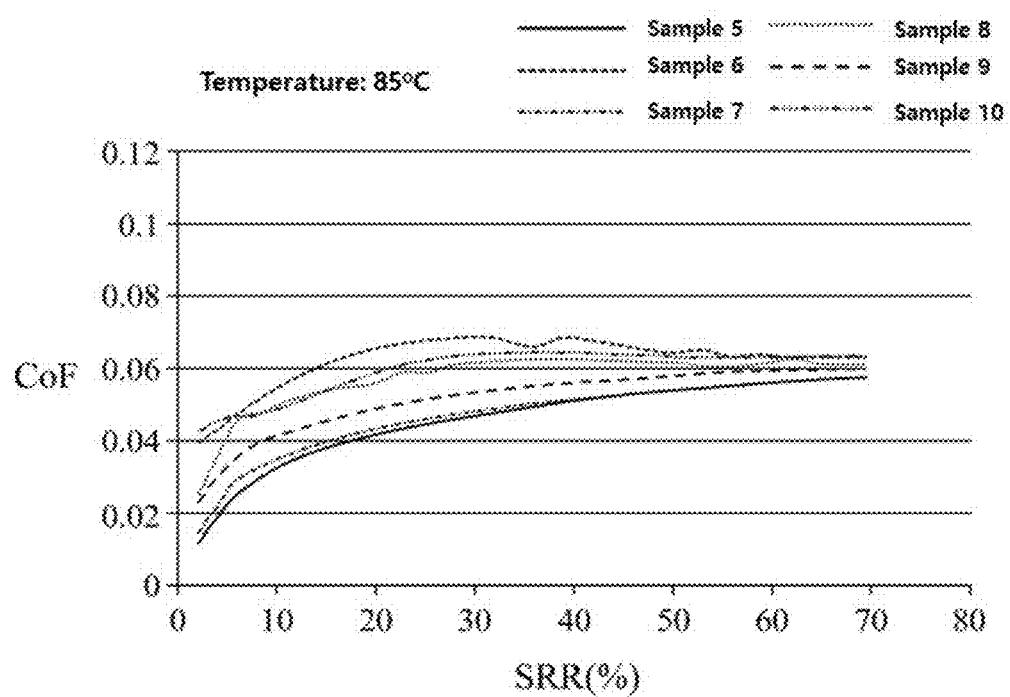
Figure 10:
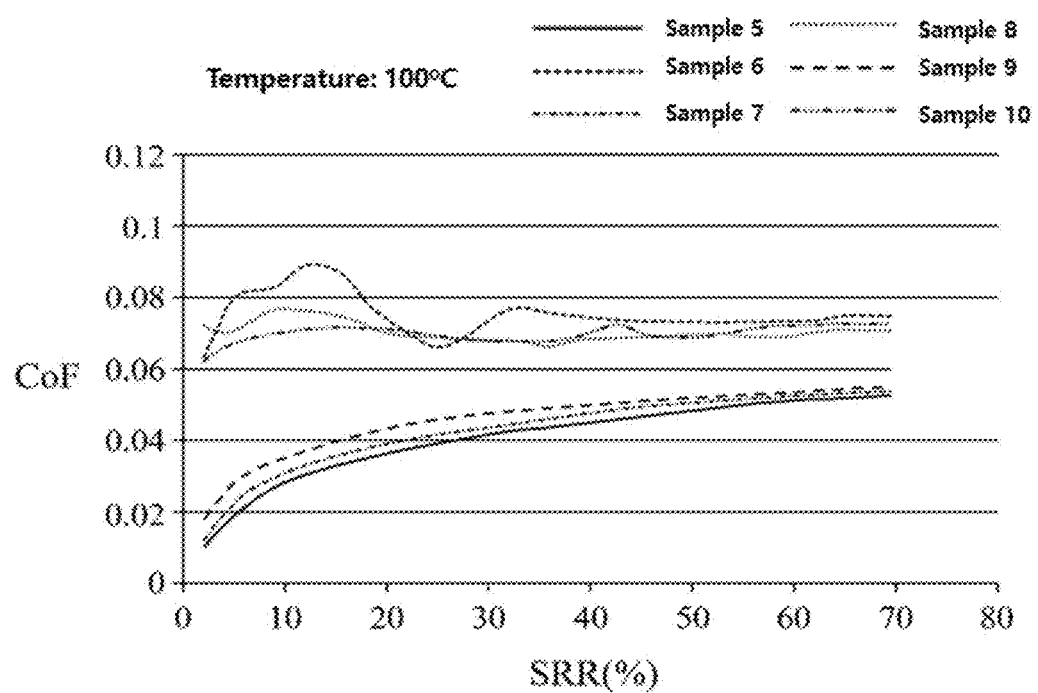

FIGS. 8 to 10 are graphs showing a change of friction coefficient according to Experimental Example 2.

Specifically, Sample 5 was an example using the base oil (excluding AA) in a load 20N, Sample 6 was an example using the monomer solution in a load of 20N, Sample 7 was an example using the base oil (excluding AA) in a load of 30N, Sample 8 was an example using the monomer solution in a load of 30N, Sample 9 was an example using the base oil (excluding AA) in a load of 50N, and Sample 10 was an example using the monomer solution in a load of 50N.

Referring to FIGS. 8 and 9, the coefficient of friction was stably maintained lower than 0.1 at which the self-polymerization was suppressed in all samples.

Referring to FIG. 10, as the temperature increased to 100° C., the coefficient of friction entirely increased in the samples containing AA while an irregular increase and decrease was also observed.

What is claimed is:

1. A method of producing an ethylene-carboxylic acid copolymer, comprising:
   supplying a monomer solution containing a carboxylic acid monomer from a discharging unit; and
   copolymerizing the carboxylic acid monomer with an ethylene-based monomer,
   wherein a coefficient of friction between the discharging unit and the monomer solution is maintained as 0.3 or less,
   wherein the coefficient of friction between the discharging unit and the monomer solution is defined as a value measured by using a Mini-Traction Machine 2 while rotating a disk and a ball therein,
   wherein a slide roll ratio between the disk and the ball is in a range of 0% to 70%,
   wherein the disk has the same surface roughness as that of the discharging unit,
   wherein a temperature in the Mini-Traction Machine 2 is the same as that in the discharging unit, and
   wherein a pressure in the Mini-Traction Machine 2 is the same as a contact pressure in the discharging unit.

2. The method of claim 1, wherein the coefficient of friction between the discharging unit and the monomer solution is maintained as 0.1 or less.

3. The method of claim 1, wherein the discharging unit comprises a piston and a packing unit surrounding the piston.

4. The method of claim 3, wherein the coefficient of friction between a surface of the piston and the monomer solution, and the coefficient of friction between the packing unit and the monomer solution are all maintained as 0.3 or less.

5. The method of claim 3, wherein the piston and the packing unit each has a surface roughness (Ra) of less than 75 nm.

6. The method of claim 3, wherein the piston and the packing unit each has a surface roughness (Ra) of 2 nm or less.

7. The method of claim 1, wherein the temperature in the discharging unit is 85° C. or less.

8. The method of claim 1, wherein the temperature in the discharging unit is from 20° C. to 60° C.

9. The method of claim 1, further comprising supplying a lubricating composition into the discharging unit.

10. The method of claim 9, wherein an amount of dissolved oxygen in the lubricating composition is 10 ppm or less.

11. The method of claim 9, wherein the lubricating composition includes a base oil and a phenothiazine-based polymerization inhibitor, and an amount of the polymerization inhibitor in the lubricating composition is from 0.1 ppm to 10 ppm.

12. The method of claim 1, wherein the copolymerizing the carboxylic acid monomer with the ethylene-based monomer comprises injecting the ethylene-based monomer after the monomer solution is supplied from the discharging unit.

13. The method of claim 1, wherein the monomer solution further includes the ethylene-based monomer, and
   wherein the copolymerizing the carboxylic acid monomer with the ethylene-based monomer comprises injecting the monomer solution containing the carboxylic acid monomer and the ethylene-based monomer into a reactor from the discharging unit.

* * * * *